US012573201B2

(12) United States Patent (10) Patent No.: US 12,573,201 B2
Sohoni (45) Date of Patent: Mar. 10, 2026

(54) SIGNATURE-BASED OBJECT TRACKING IN VIDEO FEED

(71) Applicant: Microsoft Technology Licensing, LLC, Redmond, WA (US)

(72) Inventor: Sudhanshu Uday Sohoni, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 396 days.

(21) Appl. No.: 18/180,039

(22) Filed: Mar. 7, 2023

(65) Prior Publication Data

US 2024/0177487 A1 May 30, 2024

Related U.S. Application Data

(60) Provisional application No. 63/428,625, filed on Nov. 29, 2022.

(51) Int. Cl.
  *G06K 9/34* (2006.01)
  *G06V 10/22* (2022.01)
  (Continued)

(52) U.S. Cl.
  CPC ............ *G06V 20/46* (2022.01); *G06V 10/225* (2022.01); *G06V 10/267* (2022.01); *G06V 20/52* (2022.01); *G06V 40/161* (2022.01)

(58) Field of Classification Search
  None
  See application file for complete search history.

(56) References Cited

U.S. PATENT DOCUMENTS

| | | | | |
|---|---|---|---|---|
| 8,103,062 B2 * | 1/2012 | Abe | ..................... | G06V 40/161 |
| | | | | 382/118 |
| 9,111,129 B2 * | 8/2015 | Kim | ..................... | H04N 23/611 |

(Continued)

FOREIGN PATENT DOCUMENTS

| | | | | |
|---|---|---|---|---|
| CN | 104008371 A | * | 8/2014 | |
| CN | 105631418 A | * | 6/2016 | .......... G06F 18/2411 |

(Continued)

OTHER PUBLICATIONS

CN-104008371-A (machine translation) (Year: 2014).*

(Continued)

*Primary Examiner* — Feng Niu
(74) *Attorney, Agent, or Firm* — Workman Nydegger

(57) ABSTRACT

A device may calculate a first signature for a first region of a first video frame of a video feed based on content of the first video frame. The first region is associated with a detected object of interest within the video feed. The device may calculate a second signature for a second region of a second video frame of the video feed based on content of the second video frame. The second video frame is subsequent to the first video frame within the video feed, and the second region is associated with the detected object of interest within the video feed. The device may determine a measure of difference between the first signature and the second signature. Based on the amount of difference between the first signature and the second signature exceeding a threshold, the device may trigger a signature-based object detection on the video feed.

19 Claims, 8 Drawing Sheets

100

(51) Int. Cl.

| | |
|---|---|
| *G06V 10/26* | (2022.01) |
| *G06V 20/40* | (2022.01) |
| *G06V 20/52* | (2022.01) |
| *G06V 40/16* | (2022.01) |

(56) References Cited

U.S. PATENT DOCUMENTS

| | | | | |
|---|---|---|---|---|
| 9,858,679 | B2 * | 1/2018 | Zhang | H04N 5/77 |
| 10,318,813 | B1 | 6/2019 | Pereira et al. | |
| 10,873,719 | B2 * | 12/2020 | Ohmura | G06T 7/001 |
| 11,676,383 | B2 * | 6/2023 | Subramanian | G06T 7/277 |
| | | | | 382/103 |
| 11,676,384 | B2 * | 6/2023 | Subramanian | G06T 7/20 |
| | | | | 382/103 |
| 11,804,059 | B2 * | 10/2023 | Wu | G06F 18/22 |
| 12,131,518 | B2 * | 10/2024 | Danielsson | G06V 10/762 |
| 12,315,292 | B2 * | 5/2025 | Ayyar | G06V 20/30 |
| 2007/0053660 | A1 * | 3/2007 | Abe | G06V 40/161 |
| | | | | 386/327 |
| 2009/0245573 | A1 | 10/2009 | Saptharishi et al. | |
| 2013/0120635 | A1 | 5/2013 | Kim | |
| 2016/0125232 | A1 * | 5/2016 | Zhang | G06V 10/764 |
| | | | | 382/118 |
| 2017/0359546 | A1 * | 12/2017 | Ohmura | H04N 7/181 |
| 2019/0065861 | A1 | 2/2019 | Savvides et al. | |
| 2019/0073520 | A1 * | 3/2019 | Ayyar | G06V 40/172 |
| 2019/0370980 | A1 | 12/2019 | Hollander et al. | |
| 2021/0201009 | A1 * | 7/2021 | Wu | G06V 20/52 |
| 2022/0083783 | A1 * | 3/2022 | Subramanian | G06T 7/246 |
| 2022/0198778 | A1 * | 6/2022 | Danielsson | G06V 10/762 |
| 2022/0292286 | A1 * | 9/2022 | Subramanian | G06T 7/277 |
| 2022/0292287 | A1 * | 9/2022 | Subramanian | G06V 10/255 |
| 2023/0090941 | A1 * | 3/2023 | Li | G06V 20/40 |
| | | | | 382/157 |
| 2023/0360360 | A1 * | 11/2023 | Öhrn | G06V 10/443 |

FOREIGN PATENT DOCUMENTS

| | | | | | |
|---|---|---|---|---|---|
| CN | 109951666 | A | | 6/2019 | |
| CN | 110969101 | A * | | 4/2020 | G06V 10/50 |
| CN | 111614959 | A * | | 9/2020 | H04N 19/132 |
| EP | 2076022 | A2 | | 7/2009 | |
| JP | 6906973 | B2 | | 7/2021 | |
| WO | WO-2017027212 | A1 * | | 2/2017 | G06T 7/246 |
| WO | WO-2022099988 | A1 * | | 5/2022 | G06F 7/292 |

OTHER PUBLICATIONS

CN-110969101-A (machine translation) (Year: 2020).*

WO-2022099988-A1 (machine translation) (Year: 2022).*

CN-105631418-A (machine translation) (Year: 2016).*

CN-111614959-A (machine translation) (Year: 2020).*

WO-2017027212-A1 (machine translation) (Year: 2017).*

Lyu et al., "High-speed object tracking with its application in golf playing." International Journal of Social Robotics 9, No. 3 (2017): 449-461. (Year: 2017).*

Creusen, et al., "ViCoMo: visual context modeling for scene understanding in video surveillance", Journal of Electronic Imaging, vol. 22, Issue 4, Sep. 2013, 20 pages.

Dalal, et al., "Histograms of oriented gradients for human detection", IEEE Computer Society Conference on Computer Vision and Pattern Recognition (CVPR'05), vol. 1, 2005, pp. 886-893.

International Search Report and Written Opinion received for PCT Application No. PCT/US23/036728, Feb. 26, 2024, 17 pages.

Vrecko, et al., "A computer vision integration model for a multimodal cognitive system", RSJ International Conference on Intelligent Robots and Systems—IEEE, 2009, pp. 3140-3147.

U.S. Appl. No. 63/428,625, filed Nov. 29, 2022.

International Preliminary Report on Patentability received for PCT Application No. PCT/US23/036728, mailed on Jun. 12, 2025, 11 pages.

* cited by examiner

100

500a

501

504

503

502

500b

| 505a | 505b | 505c | 505d |
| 505e | 505f | 505g | 505h |
| 505i | 505j | 505k | 505l |
| 505m | 505n | 505o | 505p |

504

507

| 506a | 506b | 506c | 506d | 506e | 506f | 506g | 506h | 506i | 506j | 506k | 506l | 506m | 506n | 506o | 506p |

600b

600a

600d

600c

1

SIGNATURE-BASED OBJECT TRACKING IN VIDEO FEED

CROSS-REFERENCE TO RELATED APPLICATIONS

This application claims priority to, and the benefit of, U.S. Provisional Application Ser. No. 63/428,625, filed Nov. 29, 2022, and entitled "SIGNATURE-BASED OBJECT TRACKING IN VIDEO FEED," the entire contents of which are incorporated by reference herein in their entirety.

BACKGROUND

When capturing image data (e.g., still images, video), many computer-controlled camera systems dynamically adjust capture parameters based on identified regions of interest (ROIs) in a subject frame. For example, ROIs are frequently used for 3A (auto focus, auto exposure, auto white balance) capture parameter adjustments, though they can be used for other capture parameter adjustments as well. Frequently, computer systems employ an object detection algorithm to identify one or more objects of interest within a frame of view, use those detected object(s) to identify ROI(s) within the frame, and adjust capture parameters based on the visual contents of at least one ROI. In one common example, computer systems employ software-driven face detection techniques to identify an ROI containing a face (or a portion thereof), and adjust one or more capture parameters based on the visual contents of that ROI to improve the capture of that face.

When capturing video feeds, the number, size, and/or location objects of interest can change as time progresses, which can render a set of one or more identified ROIs inaccurate or inapplicable. Some computer-controlled camera systems adapt to these changes by re-running an object detection algorithm at a fixed interval (e.g., every 200 milliseconds, or five times a second), and adjusting an identified set of ROIs (e.g., by adding an ROI, by removing an ROI, by adjusting a size of an ROI within a frame, by adjusting a location of an ROI within a frame) as objects of interest change.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

In some aspects, the techniques described herein relate to methods, systems, and computer products for signature-based object tracking in a video feed, including: calculating a first signature for a first region of a first video frame of a video feed based on content of the first video frame, the first region being associated with a detected object of interest within the video feed; calculating a second signature for a second region of a second video frame of the video feed based on content of the second video frame, the second video frame being subsequent to the first video frame within the video feed, the second region being associated with the detected object of interest within the video feed; determining a measure of difference between the first signature and the second signature; and based on the amount of difference between the first signature and the second signature exceeding a threshold, triggering a signature-based object detection on the video feed.

In some aspects, the techniques described herein relate to methods, systems, and computer products for signature-based object tracking in a video feed, including: calculating a first signature for a first region of a first video frame of a video feed based on content of the first video frame, the first region being associated with a detected object of interest within the video feed, the first signature characterizing a strength of edges within the first region; calculating a second signature for a second region of a second video frame of the video feed based on content of the second video frame, the second video frame being subsequent to the first video frame within the video feed, the second signature characterizing a strength of edges within the second region; determining a measure of difference between the first signature and the second signature; and based on the amount of difference between the first signature and the second signature exceeding a threshold, triggering a signature-based object detection on the video feed.

In some aspects, the techniques described herein relate to methods, systems, and computer products for signature-based object tracking in a video feed, including: calculating a first signature for a first region of a first video frame of a video feed based on content of the first video frame, the first region being associated with a detected object of interest within the video feed, wherein calculating the first signature includes: dividing the first region into a first plurality of sub-regions; calculating a first plurality of sub-region signatures, each sub-region signature corresponding to a different sub-region of the first plurality of sub-regions; and concatenating the first plurality of sub-region signatures; calculating a second signature for a second region of a second video frame of the video feed based on content of the second video frame, the second video frame being subsequent to the first video frame within the video feed, the second region being associated with the detected object of interest within the video feed, wherein calculating the second signature includes: dividing the second region into a second plurality of sub-regions; calculating a second plurality of sub-region signatures, each sub-region signature corresponding to a different sub-region of the second plurality of sub-regions; and concatenating the second plurality of sub-region signatures; determining a measure of difference between the first signature and the second signature; and based on the amount of difference between the first signature and the second signature exceeding a threshold, triggering a signature-based object detection on the video feed.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Figure 1:
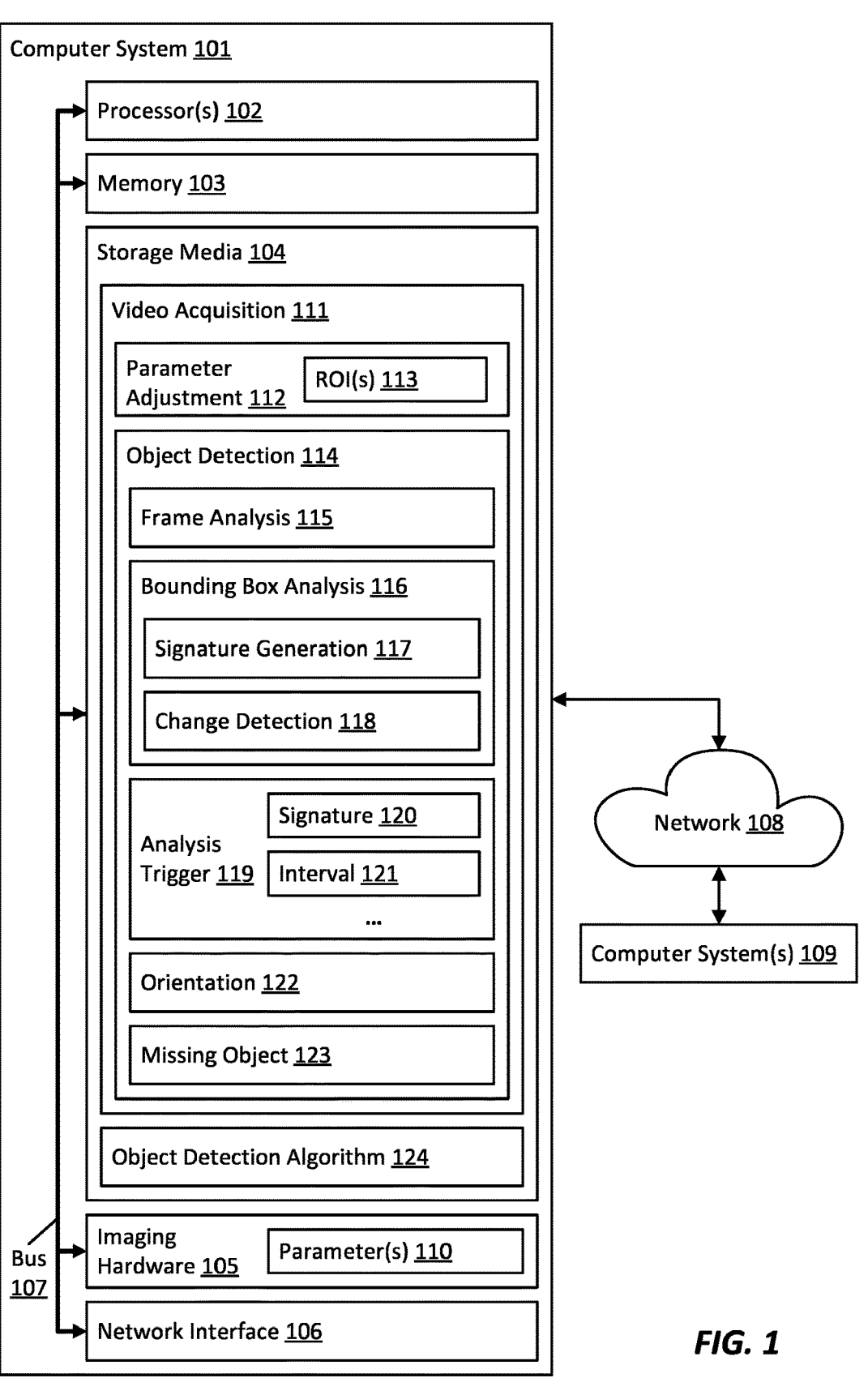
FIG. 1 illustrates an example computer architecture that facilitates signature-based object tracking in a video feed.

When choosing the interval at which to re-run an object detection algorithm during capture of a video feed for ongoing object tracking, there is an inherent conflict between ongoing object tracking accuracy and resource utilization. In general, a smaller object detection interval (e.g., more frequent detections) leads to increased object tracking accuracy, such as a reduced latency between the size/position of an object changing, and a detected bounding box of that object being updated accordingly. However, there is a resource cost (e.g., processing resources, power resources) for performing each object detection, and thus a smaller object detection interval consumes more resources than a larger object detection interval. These resource costs can be significant for many object detection algorithms, such as those that utilize artificial intelligence (AI)/machine learning (ML) models. As an example, face detection algorithms commonly use AI/ML models, and are used to track faces in video feeds. As such, conventionally, an object detection interval has been selected to balance providing an acceptable object tracking accuracy with an acceptable resource utilization. In one example, this object detection interval may be about 200 milliseconds (five times a second), in order to balance object tracking accuracy with power consumption at a mobile computing device.

The embodiments described herein enable increased object tracking performance (e.g., a reduced lag between the size/position of an object changing, and a detected bounding box of that object being updated) while also reducing resource utilization, as compared to conventional techniques. In particular, the embodiments described herein add signature-based agility to ongoing fixed-interval object tracking, resulting in fast adaptation to a moving object.

These embodiments continuously (e.g., every n frames, wherein n is a positive integer; every m milliseconds, where m is a positive integer) calculate a signature based on the contents of a bounding box of a detected object. Then, when a signature is determined to have changed a threshold amount compared to a previously-calculated signature for the same bounding box, these embodiments trigger a new object detection (and determination of a new/updated bounding box, if applicable). Because new object detections can be triggered by signature changes, when the size/location of an object has changed a new bounding box is generally identified more quickly using the techniques described herein than it would have been when using only conventional fixed detection intervals.

Additionally, based on the presence of this new signature-based agility, some embodiments reduce a baseline object detection interval, as compared to conventional techniques. In one example, a baseline object detection interval is reduced to every 500 milliseconds (two times a second), rather than every 200 milliseconds (five times a second) as may be conventional. This reduced baseline object detection interval leads to fewer overall object detections, and thus reduced computing resource (e.g., processing resource, memory resource) and energy utilization, when a tracked object is relatively stationary in the frame. These situations are relatively common in many usage scenarios-such as video conferences.

In some embodiments, the signature used in the new signature-based agility described herein is based on edge angle detection. Computing a signature based on edge angles is relatively cheap in terms of resource utilization (e.g., processing resources, memory resources, power resources). Additionally, a signature that has been generated based on edge angles accurately detects changes in a subject of interest, while being robust to interference (e.g., brightness changes, camera noise). That is, changes in the size/position of a subject of interest tend to have relatively large effects on the signature, while interference tends to have relatively small effects on the signature.

FIG. 1 illustrates an example of a computer architecture 100 that facilitates signature-based object tracking in a video feed. As shown, computer architecture 100 includes a computer system 101 comprising processor(s) 102 (e.g., a single processor, or a plurality of processors), memory 103 (e.g., system or main memory), storage media 104 (e.g., a single computer-readable storage medium, or a plurality of computer-readable storage media), all interconnected by a bus 107. As shown, computer system 101 may also include imaging hardware 105 for capturing a video feed and/or a network interface 106 (e.g., one or more network interface cards) for interconnecting (via a network 108) to computer system(s) 109 (e.g., a single computer system, or a plurality of computer systems).

The storage media 104 is illustrated as storing computer-executable instructions implementing a video acquisition component 111, which acquires a video feed from a capture source, such as imaging hardware 105 at computer system 101, or imaging hardware at computer system(s) 109. As shown, in embodiments video acquisition component 111 includes a parameter adjustment component 112, which adjusts one or more image capture parameters, such as 3A parameters (auto focus, auto exposure, auto white balance), based on one or more detected regions of interest (ROIs), illustrated as ROIs 113, within the frames of the acquired video feed. As an example, these image capture parameters are illustrated as parameter(s) 110 of imaging hardware 105.

In embodiments at least one ROI of ROIs 113 corresponds to a bounding box of an object of interest, such as a face, that is detected and tracked by an object detection component 114. Each internal component of object detection component 114 depicted represents various functionalities that object detection component 114 might implement in accordance with various embodiments described herein. It will be appreciated, however, that the depicted components—including their identity and arrangement—are presented merely as an aid in describing example embodiments of object detection component 114.

In FIG. 1, object detection component 114 includes a frame analysis component 115, which applies an object detection algorithm 124 (e.g., utilizing an AI/ML model) to a video frame in order to detect an object of interest (e.g., a face) within that video frame. In embodiments, object detection algorithm 124 utilizes a computer vision algorithm to detect instances of visual objects of certain classes, such as a human face. When utilizing an AI/ML model, that model is trained to identify certain objects of interest, such as human faces. In embodiments, operation of frame analysis component 115 is triggered by an analysis trigger component 119.

Figures 2A, 2B:
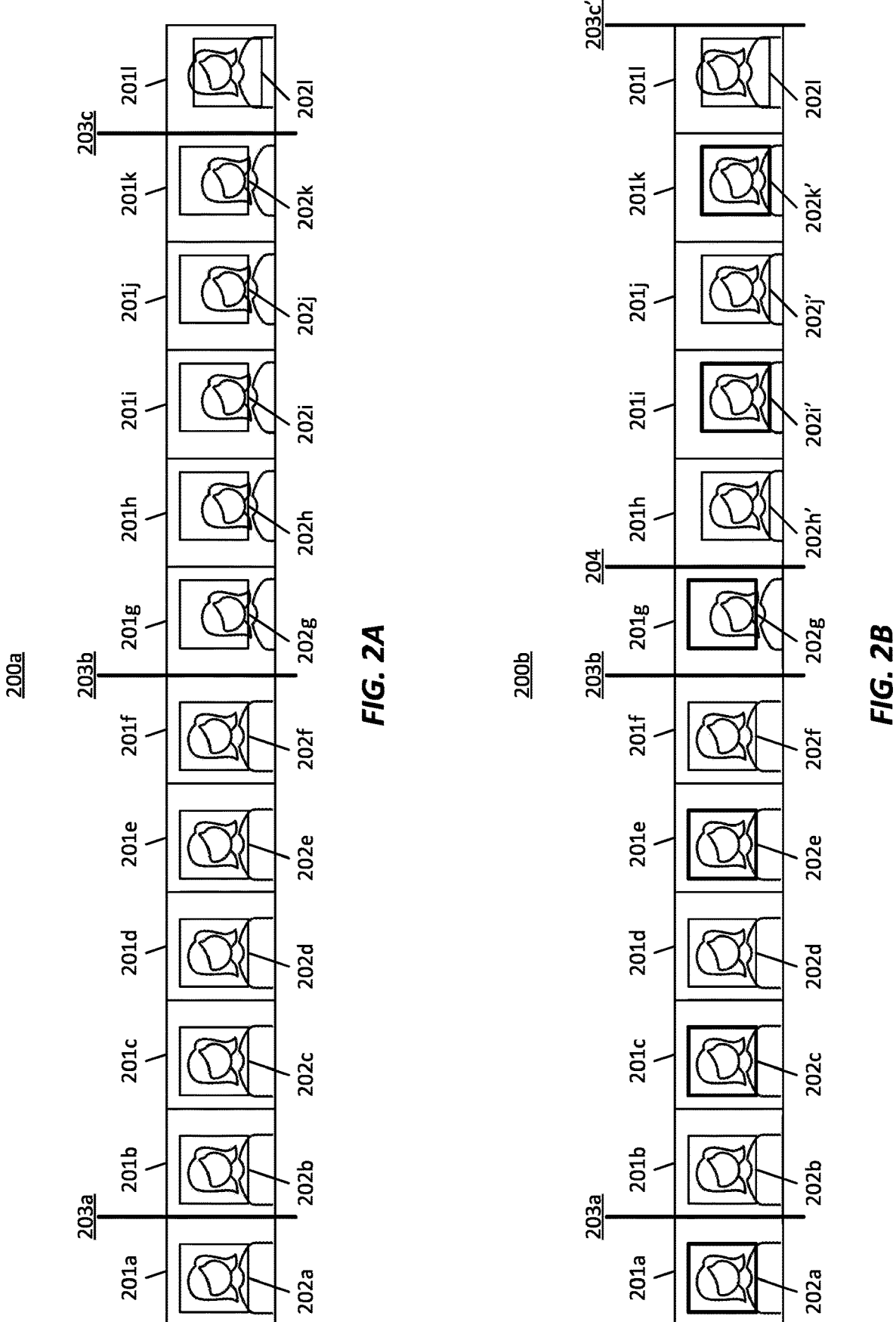
FIG. 2A illustrates an example of conventional region of interest (ROI) detection in a video feed.
FIG. 2B illustrates an example of signature-based ROI detection in a video feed.

Conventionally, frame analysis by an object detection algorithm would have occurred at fixed intervals, such as every 200 milliseconds. For example, FIG. 2A illustrates an example 200a of conventional ROI detection in a video feed. In example 200a, there is a series of frames 201 (frame 201a, 201b, 201c, 201e, 201f, 201g, 201h, 201i, 201j, 201k, and 201l), which make up a portion of video feed. These frames 201 include a subject whose face has been detected using an object detection algorithm. Each frame shows bounding boxes 202 (bounding box 202a, 202b, 202c, 202e, 202f, 202g, 202h, 202i, 202j, 202k, 202l) corresponding to the subject's face, as detected by that object detection algorithm.

In example 200a, the object detection algorithm runs at a fixed interval of every five frames, as indicated by interval-based object detection points 203 (interval-based object detection point 203a, 203b, and 203c). In each of frame 201a, 201b, 201c, 201d, 201e, and 201f, the detected bounding boxes correspond with the actual locations of the subject's face. However, after interval-based object detection point 203b, the subject's face moves down in frame 201g (e.g., due to movement of the subject and/or due to movement of a camera). This means that each of bounding box 202g, 202h, 202i, 202j, and 202k are misaligned with the subject's face in each of frame 201g, 201h, 201i, 201j, and 201k (e.g., the bounding box is too high). As shown, after interval-based object detection point 203c, bounding box 202l has shifted down to correspond with the position of the subject's face at frame 201k. However, at frame 201l, the subject's face has now moved up in frame 201l (e.g., due to movement of the subject and/or due to movement of a camera), resulting in bounding box 202l being misaligned (e.g., the bounding box is now too low).

In embodiments, to improve object tracking accuracy, analysis trigger component 119 not only triggers frame analysis component 115 at intervals (e.g., as represented by interval 121), but it also triggers frame analysis component 115 using signature-based agility (e.g., as represented by signature 120). An ellipsis indicates that other triggers are also possible (as will be described infra).

To facilitate signature-based agility, object detection component 114 is illustrated as including a bounding box analysis component 116, which includes a signature generation component 117 and a change detection component 118.

In embodiments, using signature generation component 117, bounding box analysis component 116 periodically generates a signature based at least on image contents within a given subject's bounding box. The frequency with which bounding box analysis component 116 generates signatures may vary, but, in embodiments, it is every n frames (wherein n is a positive integer), or every m milliseconds (where m is a positive integer). This frequency may be as often as every frame, though in some embodiments it is less frequent (e.g., every two frames, every three frames, every five frames).

In embodiments, using change detection component 118, bounding box analysis component 116 determines if the signature of a subject's bounding box has changed beyond a certain threshold (e.g., when a current signature is more than 50% different than a prior signature, though different thresholds could be used). In one example, change detection component 118 determines if more than a threshold (e.g., 25%, 50%, 75%) of the bits making up a current signature differ from corresponding bits in a prior signature. In embodiments, change detection component 118 tracks at least a most recent signature for a given subject's bounding box, and compares that most recent signature with a currently-calculated signature. In embodiments, if a currently-calculated signature differs from the most recent signature by more than a threshold, then bounding box analysis component 116 instructs analysis trigger component 119 to trigger a signature-based object detection (signature 120).

In some embodiments, when triggering a signature-based object detection, analysis trigger component 119 triggers a detection on the next frame (e.g., the frame after the one which caused a signature mismatch). In other embodiments, when triggering a signature-based object detection, analysis trigger component 119 triggers a detection on some future frame, such as after i frames (where i is a positive integer) or after j milliseconds (where j is a positive integer). In embodiments, increasing i or j can prevent excessive resource consumption in the event of significant (e.g., continuous) motion by a subject.

As mentioned, in embodiments, in addition to triggering signature-based object detections, analysis trigger component 119 also triggers interval-based object detections (interval 121). In some embodiments, analysis trigger component 119 triggers these interval-based object detections independent of any signature-based object detections (e.g., interval 121 triggers every n frames, or every m milliseconds, regardless of any additional signature-based object detection (s)). In other embodiments, analysis trigger component 119 adapts to signature-based object detections when triggering interval-based object detections (e.g., interval 121 triggers n frames, or m milliseconds, after the last signature-based object detection). In embodiments, due to the presence of signature-based object detections, interval-based object detections are less frequent than would be conventional (e.g., every 500 milliseconds instead of every 200 milliseconds).

FIG. 2B illustrates an example 200b of signature-based ROI detection in a video feed. Example 200b repeats the series of frames 201 from example 200a. Like example 200a, in example 200b these frames 201 include a subject whose face has been detected using an object detection algorithm (e.g., object detection algorithm 124). Each frame shows bounding boxes 202 (bounding box 202a, 202b, 202c, 202d, 202e, 202f, 202g, 202h, 202i, 202j, 202k, and 202l) corresponding to a subject's face, as detected by that object detection algorithm.

In example 200b, a signature-based object detection algorithm triggers based on identifying when signatures computed for at least a subset of bounding boxes 202 are mismatched by at least threshold amount. Additionally, in example 200b, an interval-based object detection algorithm triggers at a fixed interval of every five frames after the last signature-based detection. For example, in each of frame 201a, 201b, 201c, 201e, and 201f, the detected bounding boxes correspond with the actual locations of the subject's face, as was the case in example 200a. However, as indicated by heavy lines associated with each of bounding box 202a, 202c, and 202e, in example 200b bounding box analysis component 116 has computed a bounding box signature for every second frame of these frames (e.g., each of frame 201a, 201c, and 201e). At frame 201g, bounding box analysis component 116 computes a signature for bounding box 202g, determining that this signature mismatches the most recently-known signature (e.g., the signature for bounding box 202e) by at least a threshold amount (e.g., 50%). As such, as indicated by signature-based object detection point 204, analysis trigger component 119 triggers a signature-based object detection on frame 201g. As a result, unlike example 200a, in example 200b each of frame 201h, 201i, 201j, and 201k have bounding boxes (e.g., each of bounding box 202h', 202i', 202j', and 202k') that are aligned with the subject's face. Notably, a mismatch occurs when the subject's face moves again at frame 201l, but this will be detected at interval-based object detection point 203c' (which now occurs one frame later than an interval-based object detection point 203c occurred in example 300a, due to the presence of signature-based object detection point 204).

In FIG. 1, object detection component 114 is also illustrated as including an orientation component 122. Many object detection algorithms, such as AI/ML models, are direction-specific. That is, a subject that would normally be detected by the object detection algorithm may not actually be detected in a frame if that frame is in a different orientation than the object detection algorithm's "natural" direction. As a result, using traditional fixed interval detection techniques, there can be a significant delay in detecting an object of interest in a video frame that is oriented differently than is expected by the object detection algorithm being used.

Figures 3A, 3B:
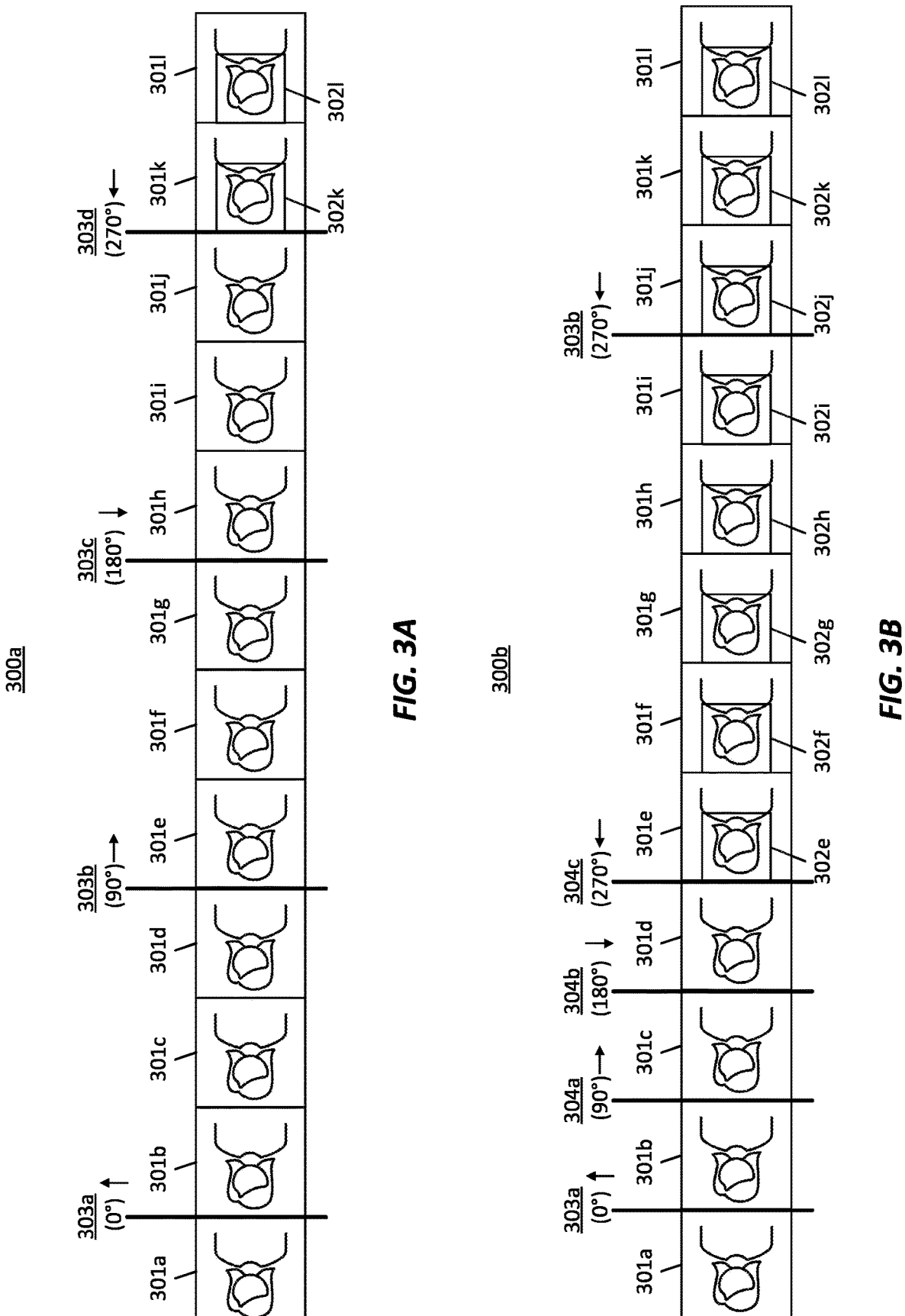
FIG. 3A illustrates an example of conventional orientation detection in a video feed.
FIG. 3B illustrates an example of improved orientation detection in a video feed.

For example, FIG. 3A illustrates an example 300a of conventional orientation detection in a video feed. In example 300a, there are a series of frames 301 (frame 301a, 301b, 301c, 301d, 301e, 301f, 301g, 301h, 301i, 301j, and 301l), which make up a portion of video feed. These frames 301 include a subject, though that subject is rotated 270° clockwise relative to the top of the frame. In example 300a, an object detection algorithm runs at a fixed interval of every three frames, as indicated by interval-based object detection points 303 (interval-based object detection point 303a, 303b, 303c, and 303d). At interval-based object detection point 303a, object detection is performed on frame 301a. Here, the "natural" direction of the object detection is 0° relative to the top of the frame, so no subject is detected. For each of the next interval-based object detection points (interval-based object detection point 303b, 303c, and 303d), successive subject frames are analyzed with 90° orientation adjustments (up to a total of 270°) until a subject (if any) is found. Thus, as shown, bounding boxes 302 (bounding box 302k and 302l) are known from frame 301k onward.

In embodiments, when no subject is detected by frame analysis component 115, orientation component 122 triggers analysis trigger component 119 to do orientation-adjusted object detections prior to a normal interval-based object detection. For example, FIG. 3B illustrates an example 300b of improved orientation detection in a video feed. In example 300b, when object detection fails at interval-based object detection point 303a, orientation component 122 triggers orientation-adjusted object detections 304 (orientation-adjusted detection point 304a, 304b, and 304c), with successive subject frames being analyzed with successive 90° orientation adjustments (up to a total of 270°) until a subject (if any) is found.

In example 300b, these additional orientation-adjusted object detections are triggered at each successive frame, but they could be triggered at a different rate (e.g., every n frames or every m milliseconds). Thus, as shown, bounding boxes 302 (bounding box 302e, 302f, 302g, 302h, 302i, 302j, 302k, and 302l) are located starting at frame 301e, rather than at frame 301k as would be the case with conventional techniques as described in connection with example 300a. As shown in example 300b, the 270° orientation continues to be used at interval-based object detection point 303b. Notably, orientation-adjustments can be accomplished by providing a rotated frame to object detection algorithm 124, or by supplying object detection algorithm 124 with an orientation hint.

In FIG. 1, object detection component 114 is also illustrated as including a missing object component 123. In embodiments, when no subject is detected after operation of orientation component 122, missing object component 123 saves a signature of an entire frame (e.g., rather than a bounding box, as has been described previously). Missing object component 123 then prevents additional triggering by analysis trigger component 119, and gathers additional frame signatures until a signature change has been detected (e.g., the entire frame has changed sufficiently enough to lead to a signature mismatch). When a signature change is detected, missing object component 123 permits operation of analysis trigger component 119 to continue.

Figure 4:
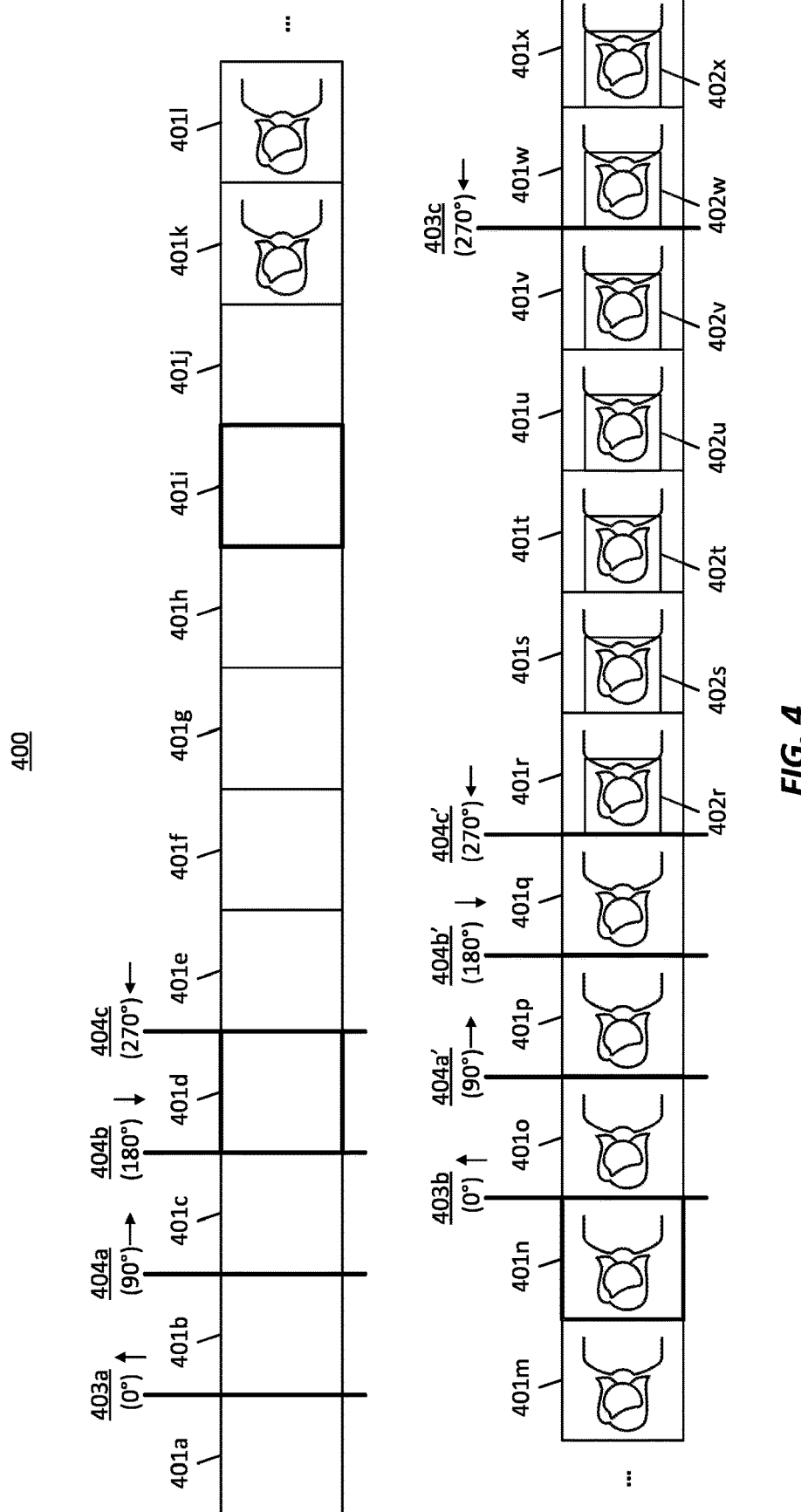
FIG. 4 illustrates an example of signature-based subject search in a video feed.

FIG. 4 illustrates an example 400 of signature-based subject search in a video feed. In example 400, there are a series of frames 401 (frame 401a, 401b, 401c, 401d, 401e, 401f, 401g, 401h, 401i, 401j, 401k, 401l, 401m, 401n, 401o, 401p, 401q, 401r, 401s, 401t, 401u, 401v, 401w, and 401x), which make up a portion of video feed. In example 400, the object detection algorithm runs at a fixed interval of every four frames. When object detection fails at interval-based object detection point 403a due to lack of the presence of any subject in frame 401a, orientation component 122 triggers additional object detections at each of orientation-adjusted detection point 404a, 404b, and 404c, with successive subject frames being orientation-adjusted by an additional 90° at each successive detection point (up to a total of 270°). This ends with no subject being found.

Based on no subject being found after operation of orientation component 122, missing object component 123 saves a signature of frame 401d, and periodically saves additional frame signatures (e.g., at frame 401i and 401n in example 400, which is every fifth frame, though any rate could be used). At frame 401n, missing object component 123 determines that the frame has now changed (e.g., based on comparing the signature of frame 401n with the signature of frame 401i), and resumes normal interval-based object detections at interval-based object detection point 403b.

In example 400, no subject is detected at interval-based object detection point 403b, so orientation component 122 triggers additional orientation-adjusted object detections at each of orientation-adjusted detection point 404a', 404b', and 404c', with successive subject frames being orientation-adjusted by an additional 90° at each detection point (up to a total of 270°) until a subject is found based on an analysis of frame 401*q* at orientation-adjusted detection point 404*c'*. Thus, as shown, bounding boxes 402 (bounding box 402*r*, 402*s*, 402*t*, 402*u*, 402*v*, 402*w*, and 402*x*) are known from frame 401*r* onward, with interval-based object detection point 403*c* using a 270° orientation adjustment.

The embodiments described herein are operable with a variety of signature types, such as pixel difference algorithms, checksums, and the like. However, in embodiments a signature type based on edge angle detection is used. When compared to other signature types—such as more conventional pixel difference algorithms—this edge angle detection-based signature uses fewer computing (e.g., processor cycles and memory) and power resources and is more robust to interference (e.g., brightness changes, camera noise). An example of operation of signature generation component 117, using this novel edge angle detection algorithm, is now described in connection with FIGS. 5A-5C.

Figure 5A:
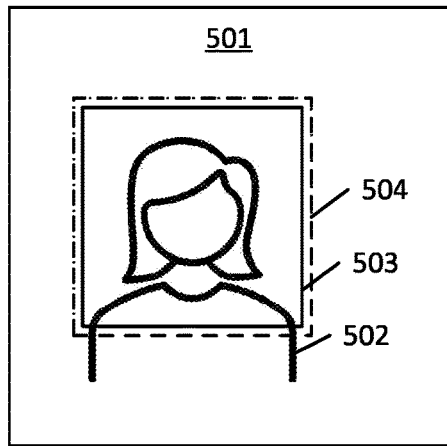
FIG. 5A illustrates an example of a bounding box defining a ROI.

In embodiments, signature generation component 117 generates a signature based at least on image contents within a bounding box of an object of interest, which in embodiments corresponds to an ROI that is used to adjust capture parameters (e.g., parameter(s) 110). For example, FIG. 5A illustrates an example 500*a* of a bounding box defining a ROI. In example 500*a*, a frame 501 represents a total image area within capture field of view of imaging hardware (e.g., imaging hardware 105), and this field of view includes a subject 502. Frame analysis component 115 has identified subject 502, along with a bounding box 503 defining an ROI associated with subject 502 (e.g., the subject's face). In some embodiments, signature generation component 117 generates a signature based on the image contents within bounding box 503.

In other embodiments, signature generation component 117 generates a signature based on the image contents of an expanded region 504 that exceeds bounding box 503. In embodiments, expanded region 504 exceeds bounding box 503 by a certain percentage (e.g., 5-10%). In embodiments, generating a signature over expanded region 504, rather than bounding box 503 acts as a motion tolerance. In particular, subject 502 can make relatively small movements (e.g., within expanded region 504) and/or relatively small camera movement can be tolerated, without altering a signature enough to trigger a signature-based detection.

Figure 5B:
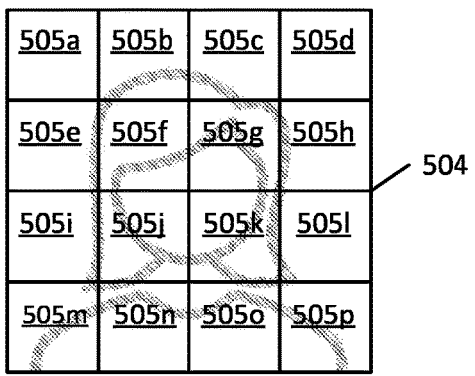
FIG. 5B illustrates an example of sub-region-based signature generation.

In embodiments, whether generating a signature based on a region corresponding to bounding box 503 or expanded region 504, signature generation component 117 divides that region into a plurality of sub-regions, generates a signature for each of those sub-regions, and then combines those sub-region signatures (e.g., via concatenation) to create a signature for the entire region. For example, FIG. 5B illustrates an example 500*b* of sub-region-based signature generation. In example 500*b*, expanded region 504 has been divided into four rows and four columns, resulting in sixteen sub-regions (sub-region 505*a*, 505*b*, 505*c*, 505*d*, 505*e*, 505*f*, 505*g*, 505*h*, 505*i*, 505*j*, 505*k*, 5051, 505*m*, 505*n*, 505*o*, and 505*p*). Notably, use of sixteen sub-regions is an example only, and embodiments could use more, or fewer, sub-regions. Example 500*b* also shows a signature 507, which is comprised of a plurality of sub-region signatures (sixteen, in this example, including sub-region signature 506*a*, 506*b*, 506*c*, 506*d*, 506*e*, 506*f*, 506*g*, 506*h*, 506*i*, 506*j*, 506*k*, 5061, 506*m*, 506*n*, 506*o*, and 506*p*). In embodiments, each sub-region signature is a signature of a corresponding sub-region. For example, sub-region signature 506*a* is a signature of sub-region 505*a*, sub-region signature 506*b* is a signature of sub-region 505*b*, sub-region signature 506*c* is a signature of sub-region 505*c*, and so on.

Figure 5C:
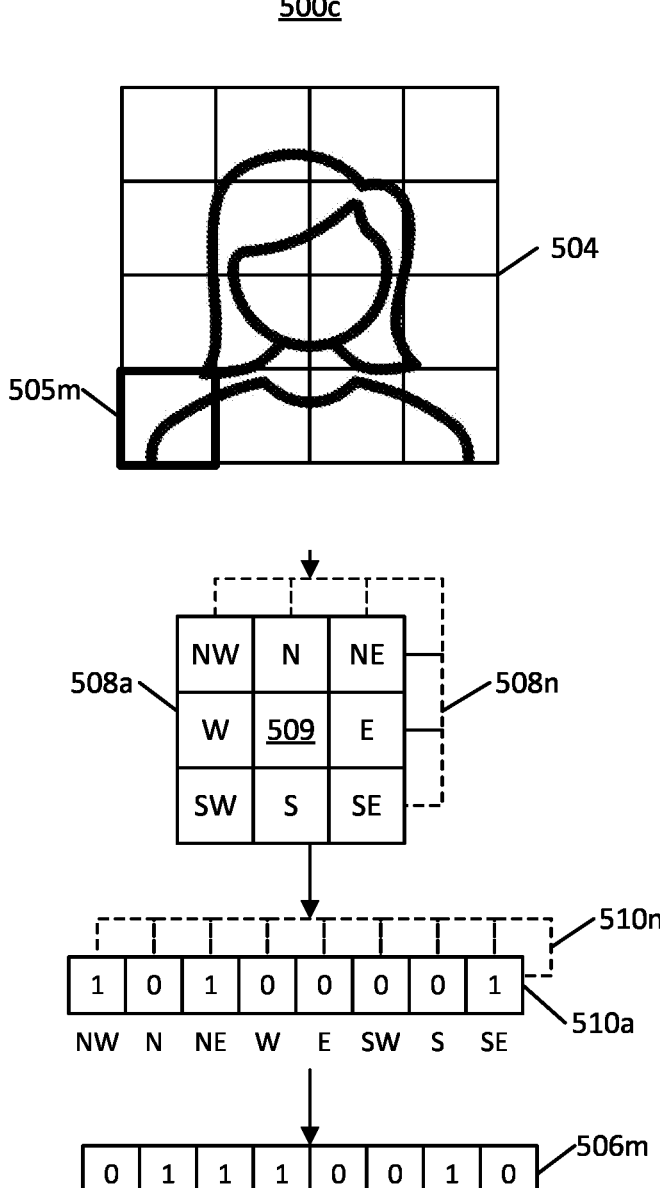
FIG. 5C illustrates an example of signature generation for a sub-region.

In embodiments, generating a signature for each sub-region includes characterizing "strong" visual edges (e.g., areas of contrast) in the sub-region. In embodiments, this comprises analyzing a plurality of pixels in the sub-region (which can include up to all of the pixels in the sub-region). In embodiments, for each pixel in the plurality, the analysis includes comparing the pixel to its neighbors, and classifying whether or not each of those neighbor pixels is a strong edge compared to the pixel. To demonstrate this process, FIG. 5C illustrates an example 500*c* of signature generation for a sub-region. Example 500*c* shows generation of sub-region signature 506*m* for sub-region 505*m*. In embodiments, the process described for sub-region 505*m* is applied to all other sub-regions. As shown, signature generation component 117 identifies a plurality of pixel groups 508 from the pixels of sub-region 505*m*, with each pixel group comprising a subject pixel and its neighbors (e.g., a neighbor to the North-West, a neighbor to the North, a neighbor to the North-East, a neighbor to the West, a neighbor to the East, a neighbor to the South-West, a neighbor to the South, and a neighbor to the South-East). Example 500*c* illustrates pixel group 508*a* based on pixel 509, and that there are x pixel groups (e.g., as indicated by pixel group 508*n*) where x is a positive integer. In embodiments, x equals a total number of pixels within sub-region 505*m*. In some situations, such as when a subject pixel is on a boundary of the sub-region, that subject pixel may have fewer neighbors in its pixel group.

In embodiments, signature generation component 117 generates a plurality of pixel group signatures 510, one for each pixel group. For instance, example 500*c* shows signature 510*a* for pixel group 508*a* and signature 510*n* for pixel group 508*n*. In embodiments, each pixel group signature comprises eight bits, each corresponding to the direction, or angle, of a different neighboring pixel (e.g., North-West or 315°, North or 0° North-East or 45°, West or 90°, East or 270°, South-West or 225°, South or 180°, and South-East or 135°). Each pixel group signature indicates which edge angle(s) (if any) border a neighboring pixel that has been determined to be a strong edge, when compared to the pixel group's subject pixel. In example 500*c*, for instance, signature 510*a* for pixel group 508*a* indicates that a pixel to the North-West and a pixel to the South-East of pixel 509 are strong edges for pixel 509. In embodiments, if a pixel group has fewer than eight neighbors (e.g., because the subject pixel is on a boundary of the sub-region), then that pixel group's signature indicates no strong edge (e.g., a zero) for any edge angle lacking a neighbor.

In embodiments, signature generation component 117 combines the plurality of pixel group signatures for each sub-region into a single sub-region signature. For instance, in example 500*c*, pixel group signatures 510 are combined into sub-region signature 506*m*. In embodiments, this combination is accomplished by merging each bit position. For example, if, among pixel group signatures 510, there is an even number of ones (or zero ones) in the NW bit position, then the NW bit position of sub-region signature 506*m* is a zero. Conversely, if, among pixel group signatures 510, there is an odd number of ones in the NW bit position, then the NW bit position of sub-region signature 506*m* is a one. In example 500*c*, each of pixel group signatures 510 are eight bits, and thus sub-region signature 506*m* is also eight bits. This means that, in example 500*b*, signature 507 comprises 128 bits (e.g., sixteen sub-region signatures of eight bits each). As mentioned supra, change detection component 118 determines if a current signature differs from a prior signature by a threshold amount. In the context of signature 507 which comprises 128 bits, change detection component 118 determines if more than a threshold percentage (e.g., 25%, 50%, 75%) of the 128 bits making up a current signature differ from corresponding bits in a prior signature (e.g., comparing the first bit in the current signature with the first bit in the prior signature, comparing the second bit in the current signature with the second bit in the prior signature, and so on).

In embodiments, when considering a single pixel group, signature generation component 117 determines whether each neighbor of a subject pixel is a strong edge based on analyzing a threshold of pixel difference between the subject pixel and the neighbor. If the difference exceeds this threshold the neighbor is determined to be a strong edge, and if the difference does not exceed this threshold the neighbor is determined to not be a strong edge. In embodiments, this threshold is a point on a logarithmic scale. In embodiments, and drawing an analogy to electrical engineering and signal processing, the threshold is a 3 decibel (dB) point on a logarithmic scale (e.g., the point at which output power has dropped to half of its mid-band level). Thus, for example, signature generation component 117 determines a 3 dB threshold based on luminance (e.g., a baseline luminance of the pixel group, of the sub-region, or of the entire region), and classifies a neighboring pixel to be on a strong edge of a subject pixel if its luminance value exceeds a 3 dB point as compared to a luminance of the subject pixel.

While edge detection can take a variety of forms, in an embodiment signature generation component 117 uses filter masks applied on each pixel in a region to generate horizontal and vertical edge strength components based on that pixel's neighbors. Then, using these horizontal and vertical edge strength components, signature generation component 117 calculates an edge strength and an edge angle for each pixel. Signature generation component 117 then determines whether the calculated edge strength for each pixel is a "strong" edge (e.g., using a 3 dB threshold). When the calculated edge strength for each pixel is a determined to be strong, signature generation component 117 sets an appropriate edge angle in the pixel's corresponding signature.

Figures 6A, 6B, 6C, 6D:
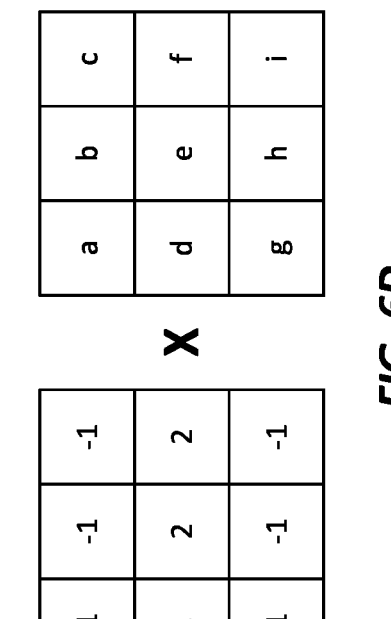
FIG. 6A illustrates an example of a vertical filter mask for edge detection.
FIG. 6B illustrates an example of a horizontal filter mask for edge detection.
FIG. 6C illustrates an example of application of a vertical filter mask to a pixel.
FIG. 6D illustrates an example of application of a horizontal filter mask to a pixel.

FIGS. 6A-6D illustrate one particular example of this edge detection technique, though variations are possible. In embodiments, signature generation component 117 utilizes a vertical filter mask for obtaining vertical (dy) components for a given pixel, and utilizes a horizontal filter mask for obtaining horizontal (dx) components for the pixel. FIG. 6A illustrates an example 600a of a vertical filter mask (e.g., for obtaining a dy components), while FIG. 6B illustrates an example 600b of a horizontal filter mask (e.g., for obtaining a dx components). The values shown in example 600a and example 600b are illustrative only, and it will be appreciated that different values could be used, consistent with the description herein.

In embodiments, signature generation component 117 applies these filter masks to a given pixel by multiplying each mask co-efficient by a corresponding pixel, and adding/accumulating the resulting values. For example, FIG. 6C illustrates an example 600c of application of the vertical filter mask of example 600a to a pixel (e.g., pixel e) based on that pixel's neighbors (e.g., pixels a, b, c, d, f, g, h, and i) to obtain a vertical (dy) component for the pixel. In embodiments, after multiplying each vertical mask co-efficient by a corresponding pixel, signature generation component 117 calculates a dy component using Equation 1:

$$dy=2*(d+e+f)-(a+b+c+g+h+i) \qquad \text{Equation 1}$$

FIG. 6D illustrates an example 600d of application of the horizontal filter mask of example 600b to a pixel (e.g., pixel e) based on that pixel's neighbors (e.g., pixels a, b, c, d, f, g, h, and i) to obtain a horizontal (dx) component for the pixel. In embodiments, after multiplying each horizontal mask co-efficient by a corresponding pixel, signature generation component 117 calculates a dx component using Equation 2:

$$dx=2*(b+e+h)-(a+d+g+c+f+i) \qquad \text{Equation 2}$$

In embodiments, after calculating dy and dx components, signature generation component 117 calculates an edge strength ($\alpha$) for the pixel using Equation 3:

$$\alpha=dx^2+dy^2 \qquad \text{Equation 3}$$

In embodiments, signature generation component 117 also calculates an edge angle (e) for the pixel using Equation 4:

$$\Theta = \tan^{-1}\left(\frac{dy}{dx}\right) \qquad \text{Equation 4}$$

In embodiments, signature generation component 117 utilizes a logarithmic delta ($\delta$). For example, in one embodiment, signature generation component 117 utilizes 3 dB logarithmic delta, as calculated using Equation 5:

$$\delta = \log^{-1}10\left(\frac{3}{20}\right) = 1.412538 \qquad \text{Equation 5}$$

In this embodiment, if T is a linear threshold equivalent to −3 dB, then a 3 dB down logarithmic threshold is characterized by Equation 6:

$$20*\log(T)=20*\log_{10}(e)-3 \text{ dB} \qquad \text{Equation 6}$$

Taking log inverse of both sides of Equation 6, T is calculated as shown in Equation 7 to Equation 10:

$$T = \frac{e}{\log^{-1}10\left(\frac{3}{20}\right)} \qquad \text{Equation 7}$$

$$T = \frac{e}{\delta} \qquad \text{Equation 8}$$

$$T = \frac{e}{1.412538} \qquad \text{Equation 9}$$

$$T = e*0.7079 \qquad \text{Equation 10}$$

In embodiments, if the calculated edge strength ($\alpha$) of a pixel is greater than (e−T), the edge is considered to be a strong edge, and signature generation component 117 sets the edge angle ($\theta$) in the pixel's corresponding signature (e.g., signature 510a). For example:

```
if (α > (e−T))
{
    classify (θ) into 8 directions.
    set appropriate bit in the pixel's 8-bit signature
}
```

Figure 7:
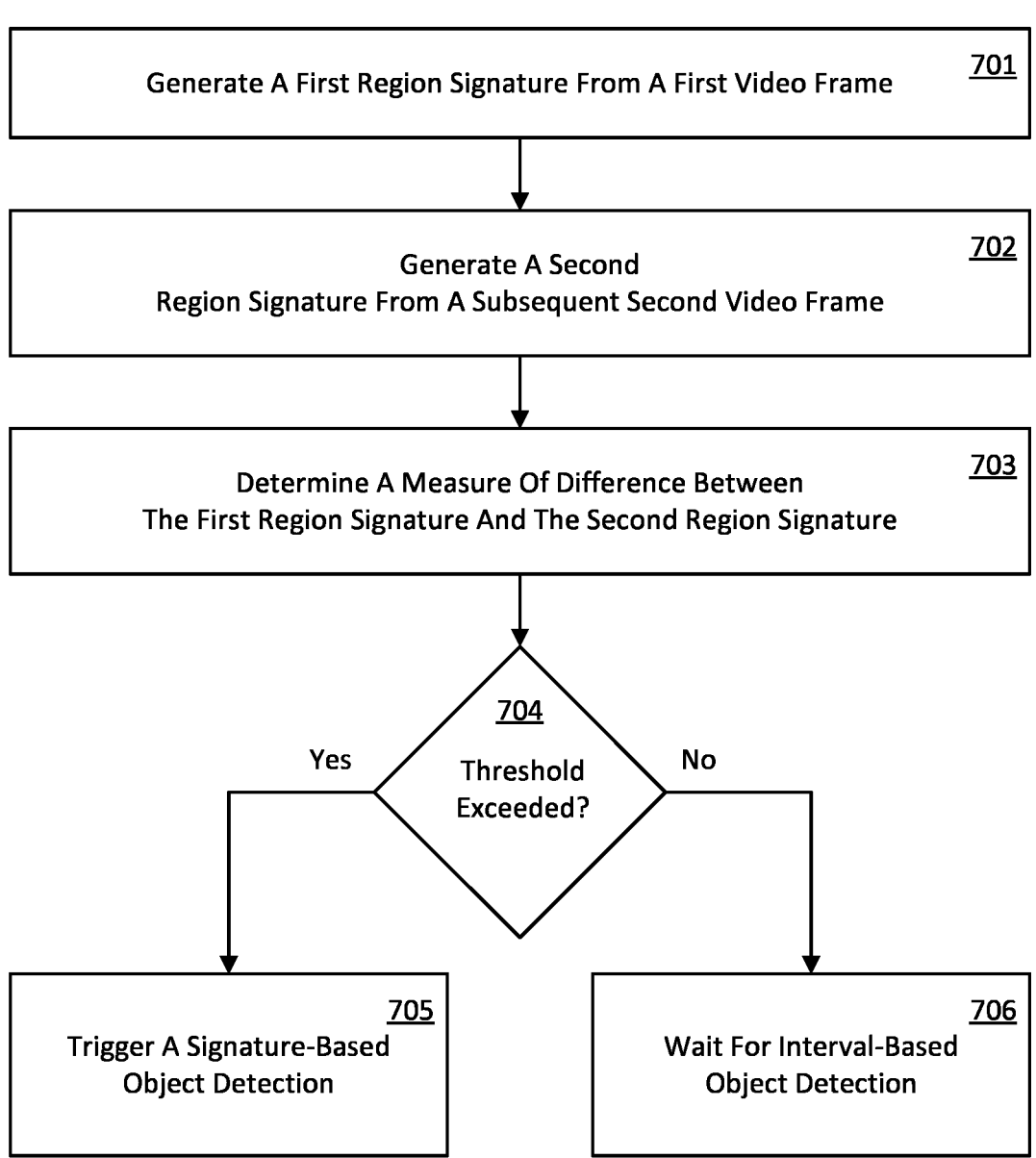
FIG. 7 illustrates a flow chart of an example method for signature-based object tracking in a video feed.

Embodiments are now described further in connection with FIG. 7, which illustrates a flow chart of an example method 700 for signature-based object tracking in a video feed. In embodiments, instructions for implementing method 700 are encoded as computer-executable instructions (e.g., object detection component 114) stored on a computer storage media (e.g., storage media 104) that are executable by a processor (e.g., processor(s) 102) to cause a computer system (e.g., computer system 101) to perform method 700.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring to FIG. 7, in embodiments, method 700 comprises an act 701 of generating a first region signature from a first video frame. In some embodiments, act 701 comprises calculating a first signature for a first region of a first video frame of a video feed based on content of the first video frame, the first region being associated with a detected object of interest within the video feed. In an example, signature generation component 117 generates a signature of bounding box 202*e* from frame 201*e* (FIG. 2B).

Method 700 also comprises an act 702 of generating a second region signature from a subsequent second video frame. In some embodiments, act 702 comprises calculating a second signature for a second region of a second video frame of the video feed based on content of the second video frame, the second video frame being subsequent to the first video frame within the video feed, the second region being associated with the detected object of interest within the video feed. In an example, signature generation component 117 generates a signature of bounding box 202*g* from frame 201*g* (FIG. 2B).

In some embodiments each region corresponds to a bounding box of the detected object of interest. For example, in example 200*b*, bounding box 202*e* (first region) and bounding box 202*g* (second region) each correspond to a subject's face. In some embodiments, each of the first region and the second region includes an expanded region exceeding a bounding box of the detected object of interest. For example, example 500*a* demonstrated that, rather than using bounding box 503, signature generation component 117 could use expanded region 504.

As described in connection with example 500*b*, in embodiments, calculating a signature for a region (e.g., expanded region 504) includes dividing the region into a plurality of sub-regions (e.g., sub-region 505*a* to sub-region 505*p*); calculating a plurality of sub-region signatures (e.g., sub-region signature 506*a* to sub-region signature 506*p*) corresponding to the plurality of sub-regions, respectively (e.g., each sub-region signature corresponds to a different sub-region of the plurality of sub-regions); and concatenating the plurality of sub-region signatures (e.g., signature 507).

As described in connection with example 500*c*, in embodiments, calculating the plurality of sub-region signatures (e.g., sub-region signature 506*a* to sub-region signature 506*p*) comprises, for each sub-region signature of the plurality of sub-region signatures: identifying a plurality of pixel groups in the sub-region (e.g., pixel groups 508); generating a plurality of pixel group signatures (e.g., pixel group signatures 510) corresponding to the plurality of pixel groups, respectively, and indicating a set of neighbors in the pixel group having luminance that exceeds a subject luminance of a subject pixel in the pixel group by at least a threshold; and creating the sub-region signature (e.g., sub-region signature 506*m*) based on combining the plurality of pixel group signatures.

In embodiments, each pixel group signature indicates strong edges of a pixel based on an edge angle relative to the pixel. Thus, in embodiments, each of the first signature and the second signature characterizes a strength of edges within its corresponding region.

Method 700 also comprises an act 703 of determining a measure of difference between the first region signature and the second region signature. In some embodiments, act 703 comprises determining a measure of difference between the first signature and the second signature. In an example, change detection component 118 determines a measure of difference between the first signature calculated in act 701 and the second signature calculated in act 702. In embodiments, this includes change detection component 118 determining a number of bits that differ between the first signature and the second signature.

Method 700 also comprises an act 704 of determining if the difference exceeds a threshold. In an example, change detection component 118 determines if a number of bits that differ between the first region signature and the second region signature exceed a certain threshold (e.g., 50%).

In embodiments, when the difference does exceed the threshold, (e.g., "Yes" from act 704), method 700 includes an act 705 of triggering a signature-based object detection. In some embodiments, act 705 comprises, based on the amount of difference between the first signature and the second signature exceeding a threshold, triggering a signature-based object detection on the video feed. In an example, when the first signature of bounding box 202*e* differs from the second signature of bounding box 202*g*, bounding box analysis component 116 instructs analysis trigger component 119 to trigger a signature-based object detection (signature 120). In an example, in FIG. 2B, this indicated as signature-based object detection point 204. In some embodiments, triggering the signature-based object detection on the video feed comprises triggering a face detection using an AI model or an ML model.

In embodiments, when the difference does not exceed the threshold (e.g., "No" from act 704) method 700 includes an act 706 of waiting for interval-based object detection (e.g., interval-based object detection point 203*c'* in FIG. 2B). Thus, in embodiments, method 700 further comprises, subsequent to triggering the signature-based object detection on the video feed, triggering an interval-based object detection on the video feed.

In embodiments, method 700 repeats continuously, meaning that even when method 700 proceeds to act 706, a signature-based object detection could be triggered prior to an interval-based object detection.

As described in connection with FIG. 3B, some embodiments trigger an orientation-based object detection when no object of interest is detected. Thus, in some embodiments, method 700 further comprises, based on an object detection on the video feed failing to locate an object of interest, triggering an orientation-based object detection. As described in connection with FIG. 4, this can include using a signature of an entire video frame, rather than an ROI. Thus, in some embodiments, method 700 further comprises based on an object detection on the video feed failing to locate an object of interest, generating a signature on an entire frame of the video feed.

Embodiments of the disclosure may comprise or utilize a special-purpose or general-purpose computer system (e.g., computer system 101) that includes computer hardware, such as, for example, a processor system (e.g., processor(s) 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 106), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a processor system, comprising:

calculating a first signature for a first bounding box within a first video frame of a video feed based on first content of the first video frame, the first bounding box encompassing at least a portion of a detected object of interest within the video feed;

calculating a second signature for a second bounding box within a second video frame of the video feed based on second content of the second video frame, the second video frame being subsequent to the first video frame within the video feed, the second bounding box encompassing at least a portion of the detected object of interest;

determining a measure of difference between the first signature and the second signature; and based on an amount of difference between the first signature and the second signature exceeding a threshold, triggering an object detection on the video feed.

2. The method of claim 1, wherein calculating the first signature comprises:

dividing the first bounding box into a plurality of sub-regions;

calculating a plurality of sub-region signatures corresponding to the plurality of sub-regions, respectively; and concatenating the plurality of sub-region signatures.

3. The method of claim 2, wherein calculating the plurality of sub-region signatures comprises, for each sub-region in the plurality of sub-regions:

identifying a plurality of pixel groups in the sub-region, each pixel group comprising a subject pixel and a plurality of neighbor pixels that bound the subject pixel;

generating a plurality of pixel group signatures, each pixel group signature corresponding to a different pixel group in the plurality of pixel groups; and creating a sub-region signature based on combining the plurality of pixel group signatures.

4. The method of claim 3, wherein each pixel group signature indicates a contrasting pixel based on an edge angle relative to the subject pixel.

5. The method of claim 1, wherein each of the first bounding box and the second bounding box includes an expanded region exceeding an initial bounding box of the detected object of interest.

6. The method of claim 1, further comprising, based on the object detection on the video feed failing to locate an object of interest, triggering an orientation-based object detection that rotates a video frame.

7. The method of claim 1, further comprising, based on the object detection on the video feed failing to locate an object of interest, generating a signature on an entire frame of the video feed.

8. The method of claim 1, wherein triggering the object detection on the video feed comprises triggering a face detection using an artificial intelligence model or a machine learning model.

9. The method of claim 1, further comprising, subsequent to triggering the object detection on the video feed, triggering an interval-based object detection on the video feed.

10. A computer system comprising:

a processor system; and a computer storage medium that stores computer-executable instructions that are executable by the processor system to at least:

calculate a first signature for a first bounding box within a first video frame of a video feed based on first content of the first video frame, the first bounding box encompassing at least a portion of a detected object of interest within the video feed, the first signature characterizing a strength of edges within the first bounding box;

calculate a second signature for a second bounding box within a second video frame of the video feed based on second content of the second video frame, the second video frame being subsequent to the first video frame within the video feed, the second bounding box encompassing at least a portion of the detected object of interest, and the second signature characterizing a strength of edges within the second bounding box;

determine a measure of difference between the first signature and the second signature; and based on an amount of difference between the first signature and the second signature exceeding a threshold, trigger an object detection on the video feed.

11. The computer system of claim 10, wherein calculating the first signature comprises:

dividing the first bounding box into a plurality of sub-regions;

calculating a plurality of sub-region signatures corresponding to the plurality of sub-regions, respectively; and concatenating the plurality of sub-region signatures.

12. The computer system of claim 10, wherein each of the first bounding box and the second bounding box corresponds to an initial bounding box of the detected object of interest.

13. The computer system of claim 10, wherein each of the first bounding box and the second bounding box includes an expanded region exceeding an initial bounding box of the detected object of interest.

14. The computer system of claim 10, the computer-executable instructions also executable by the processor system to at least, based on the object detection on the video feed failing to locate an object of interest, triggering an orientation-based object detection that rotates a video frame.

15. The computer system of claim 10, the computer-executable instructions also executable by the processor system to at least, based on the object detection on the video feed failing to locate an object of interest, generating a signature on an entire frame of the video feed.

16. The computer system of claim 10, wherein triggering the object detection on the video feed comprises triggering a face detection using an artificial intelligence model or a machine learning model.

17. A computer system comprising:

a processor system; and a computer storage medium that stores computer-executable instructions that are executable by the processor system to at least:

calculate a first signature for a first bounding box within a first video frame of a video feed based on first content of the first video frame, the first bounding box encompassing at least a portion of a detected object of interest within the video feed;

calculate a second signature for a second bounding box within a second video frame of the video feed based on second content of the second video frame, the second video frame being subsequent to the first video frame within the video feed, the second bounding box encompassing at least a portion of the detected object of interest;

determine a measure of difference between the first signature and the second signature; and based on an amount of difference between the first signature and the second signature exceeding a threshold, trigger an object detection on the video feed.

18. The computer system of claim 17, wherein calculating the first signature comprises:

dividing the first bounding box into a plurality of sub-regions;

calculating a plurality of sub-region signatures corresponding to the plurality of sub-regions, respectively; and concatenating the plurality of sub-region signatures.

19. The computer system of claim 18, wherein calculating the plurality of sub-region signatures comprises, for each sub-region in the plurality of sub-regions:

identifying a plurality of pixel groups in the sub-region, each pixel group comprising a subject pixel and a plurality of neighbor pixels that bound the subject pixel;

generating a plurality of pixel group signatures, each pixel group signature corresponding to a different pixel group in the plurality of pixel groups; and creating a sub-region signature based on combining the plurality of pixel group signatures.

* * * * *